Nov. 17, 1953
G. H. HERBERT
2,659,344
ENCLOSURE DEVICE FOR PET ANIMALS
Filed Sept. 9, 1950
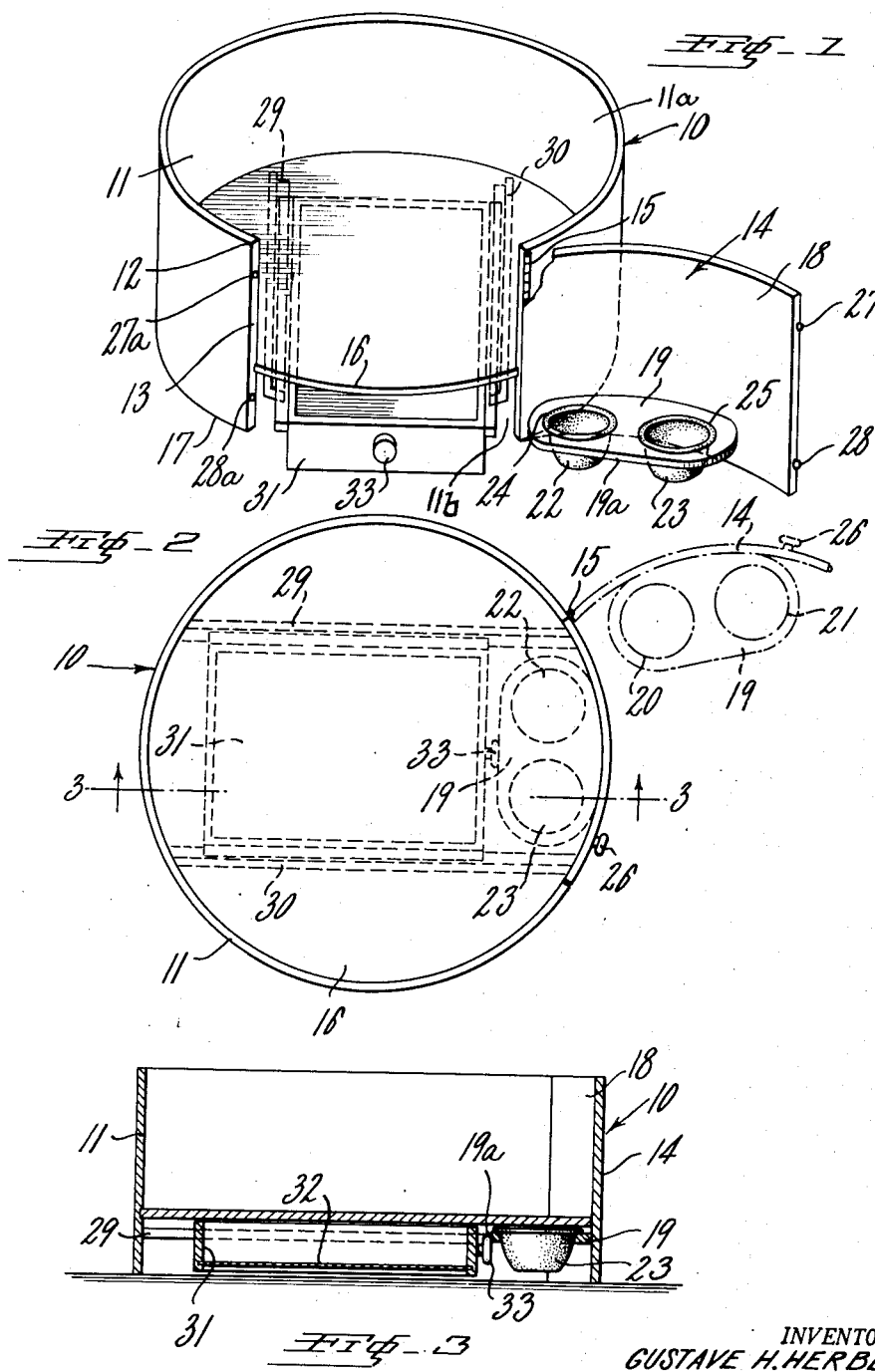
INVENTOR.
GUSTAVE H. HERBERT
BY Patented Nov. 17, 1953

2,659,344

UNITED STATES PATENT OFFICE 2,659,344

ENCLOSURE DEVICE FOR PET ANIMALS

Gustave H. Herbert, Bronxville, N. Y.

Application September 9, 1950, Serial No. 183,938

7 Claims. (Cl. 119—1)

This invention relates to a piece of furniture serving as a seat or resting place for pet animals, such as puppies, dogs, cats, etc.

It is one of the main objects of the invention to provide means affording a convenient bed and food trough assembly for accommodating pet animals during rest and feeding times of the latter.

It is another object of the invention to provide means facilitating the manufacture of a compact and very efficient piece of furniture for pet animals, which may be easily moved and transported from place to place and which is shaped to conform to the outline of the back of a cat, dog and like pet animal, when in resting and lying position.

It is still another object of the invention to provide means rendering the possibility of employing the aforesaid piece of furniture as an enclosure or boundary for puppies and like animals and of connecting to said piece of furniture a device from which said puppies may be fed, said device being movable out of sight and range of the pet animals, if desired.

Still a further object of the present invention is to provide means contributing to considerable improvements in enclosure structures for pet animals, such structures being light in weight, very compact, inexpensive to manufacture, of aesthetic appearance and practical and efficient in use and operation.

Yet a further object of the present invention resides in the provision of means offering the possibility of accommodating food troughs or bowls for the animal or animals and a drawer for holding toys and medicines beneath the bottom of the enclosure structure when the same is in closed position.

Other objects of the invention will be pointed out in the following description and claims and will be derived from the accompanying drawing which discloses, by way of example, the principle of the invention and a preferred mode which has been contemplated of applying said principle.

In the drawing:

Fig. 1 is a perspective front view of the animal enclosure device with a door thereof and drawer partly in open position.

Fig. 2 is a top plan view of the device of Fig. 1 with the door and drawer in closed position, the open position of such door being shown in dot and dash lines.

Fig. 3 is a cross section taken along line 3—3 of Fig. 2.

Referring now more particularly to the drawing there is shown in Fig. 1 a substantially circular enclosure device 10 forming a combination bed and food trough or bowl assembly. The upright body 11 includes a curved wall terminating in a lower edge and is made from plywood, plastic or plastic composition or similar material.

At the front 12 of body 11 there is provided a cutout 13 adapted to be closed by a swinging door 14 mounted on body 11 by means of a suitable hinge 15 for swinging movement into and out of a closed position with respect to the cutout 13. Enclosure device 10 has further a bottom 16 which extends a predetermined distance from the bottom edge 17 of body 11. The wall of the body 11 above the bottom 16 and the latter cooperate to define an upper compartment, while the wall of the body 11 below the bottom 16 and the latter cooperate to define a lower compartment. At the inner face 18 of door 14 and at a location below the bottom 16 there is arranged a shelf or carrier 19 having openings 20, 21 for removably receiving bowls 22, 23 provided with flange shaped rims 24, 25 to retain the bowls 22, 23 in substantially upright position on shelf 19.

Door 14 may be moved by means of a door knob 26 about hinge 15 to open and closed positions, respectively, such door being retained in closed position by means of spring actuated pins 27, 28 which engage corresponding openings 27a, 28a provided in the end wall of body 11 so that when door 14 is swung to closed position body 11 forms a substantially circular shaped enclosure. The pins 27, 28 and openings 27a, 28a cooperate to form respective interengaging means on the door 14 and body 11 for detachably securing the door in closed position.

It will be noted that shelf 19 is so arranged on door 14 that the bowls or troughs 22 and 23 are within easy reach of the animals when the door is swung to open position. At the underface of bottom 16 and within the lower compartment there are provided tracks 29 and 30 which are aligned with the cutout 13 and are adapted to slidably receive a drawer 31 which is provided with a bottom 32 and a knob 33, the latter being arranged for moving said drawer 31 along tracks 29 and 30 to open position, as seen in Fig. 1. Accordingly the drawer 31 can be moved within the lower compartment from a retracted position wherein the bottom 16 forms a cover for the drawer to an extended position wherein the drawer is accessible exteriorly of the tray 11 at the cutout 13.

As can be further realized from Fig. 3 shelf 19 is so arranged on door 14 that the forward end 19a of the shelf may abut against knob 33 to maintain said drawer 31 in its closed position, as seen in Figs. 2 and 3.

As it is apparent from Figs. 1 and 2 the enclosure device 10 is of arcuate shape so as to facilitate accommodation of pet animals which have generally a curved back when in resting or lying position.

It is further of importance that the bottom 16 is raised from the floor in order to protect the animal from any draft. During rest periods of the animal or animals the food and water containing bowls are removed from the sight of the animal and accommodated below the bottom of the enclosure device in which drawer the usual toy assortment and other equipment used for cleaning or washing the animal may be placed. Such drawer is further useful for receiving medicines or other treatment articles as it is well understood.

Although the enclosure device 10 is shown with an upper circular-shaped circumferential edge and also with a lower circular-shaped circumferential edge defining, respectively, the open top of upper compartment 11a and open bottom of compartment 11b, it is well understood that the shape of the compartments 11a and 11b may be different from each other or may be at least partly circular in order to conform the same to the outline of the back of a cat, dog and the like when in resting and lying position.

It can thus be seen that there has been provided in accordance with the present invention an enclosure device for animals; comprising a substantially circular body having an upper edge and a lower edge, a bottom fixed to said body and partitioned intermediate said edges to form an upper compartment and a lower compartment, respectively, said body being provided with a cut-out, a swingable door hinged to said body and adapted to close said cut-out, a shelf provided with an opening and associated with said door, a food trough insertable in said opening, and a drawer slidably disposed in said lower compartment, whereby said bottom forms the cover for said drawer in predetermined position of the latter, said shelf being arranged for movement into said lower compartment when said cut-out is closed by said door.

Changes may be made in regard to the equipment and operation of the device herein disclosed without departing from the spirit of this invention.

Having thus described the invention, what is claimed as new and desired to be secured by Letters Patent, is:

1. In an enclosure for animals; a body terminating in a lower peripheral edge, a bottom positioned a predetermined distance from said lower edge to thereby form an upper compartment open on its top end, and a lower compartment open on its bottom end, said body being provided with a cut-out, a swingable door hinged to said body and adapted to close said cut-out, a shelf associated with said door and having an opening and a forward edge, a food trough insertable in said opening, a drawer having a knob and slidable in said lower compartment whereby said bottom forms the cover for said drawer in predetermined position of the latter, and means mounting said drawer on said bottom for sliding movement withdrawer on said bottom for sliding movement within said lower compartment, said shelf being movable into said lower compartment when said cut-out is closed by said door, whereby said forward edge of the shelf abuts against said knob to secure retainment of said drawer within said lower compartment.

2. In an enclosure device for animals; a body having an upper edge and a lower edge, a partition fixed to said body intermediate said edges to form a bottom for an upper compartment and a top cover for a lower compartment, respectively, said body being provided with a cut-out, a swingable door hinged to said body and adapted to close said cut-out, a shelf provided with an opening for inserting therein a food trough and associated with said door, and a drawer slidably disposed in said lower compartment, whereby said partition forms the stationary cover for said drawer in predetermined position of the latter, said shelf being arranged for movement into said lower compartment when said cut-out is closed by said door, a portion of said partition also forming the stationary cover for said food trough when inserted in said shelf opening.

3. An enclosure device comprising a body having a lower peripheral edge, a bottom spaced above said lower peripheral edge and secured within said body to form an upper compartment and a lower compartment, said body being provided with a cutout communicating with said upper and lower compartments, a door receivable within said cutout and mounted on said body for swinging movement into and out of a closed position with respect to said cutout, a drawer disposed within said lower compartment and mounted for movement therein from a retracted position wherein said bottom forms a cover for said drawer to an extended position wherein said drawer is accessible exteriorly of said body at said cutout, and a carrier projecting from said door and movable into said lower compartment in response to swinging movement of said door into said closed position, said carrier forming a stop for said drawer and maintaining the latter against movement when said drawer is in said retracted position.

4. An enclosure device according to claim 3, wherein said body is curved in cross-section, and said door is complementary to said cutout to form a continuation of said body when said door is in said closed position.

5. An enclosure device according to claim 3, including trough means carried on said carrier and receivable within said lower compartment in said closed position of said door.

6. An enclosure device according to claim 3, including respective interengaging means on said door and said body for detachably securing said door in said closed position.

7. An enclosure device for animals comprising an upright body including a curved wall terminating in a lower edge, a horizontally disposed bottom spaced above said lower edge and secured within said body, the wall of said body above said bottom and the latter cooperating to define an upper compartment and the wall of said body below said bottom and the latter cooperating to define a lower compartment, said body being provided with a cutout communicating with said upper and lower compartments, respectively, a door closing said cutout and mounted for swinging movement to an open position with respect to said cutout, a drawer disposed within said lower compartment, mounting means carried within said lower compartment in alignment with said cutout and mounting said drawer for movement to an extended position wherein said drawer is accessible exteriorly of said body at said cutout, and a food carrier projecting from said door at a location below said bottom and extending into said lower compartment when said door is closed to form a stop for said drawer to maintain the latter against movement.

GUSTAVE H. HERBERT.

References Cited in the file of this patent

UNITED STATES PATENTS

| Number | Name | Date |
|---|---|---|
| 1,878,459 | Bliss, Jr., et al. | Sept. 20, 1932 |
| 2,390,854 | Thompson | Dec. 11, 1945 |
| 2,488,035 | Pistone | Nov. 15, 1949 |

FOREIGN PATENTS

| Number | Country | Date |
|---|---|---|
| 21,577 | Great Britain | 1903 |
| 80,537 | Sweden | May 29, 1934 |
| 506,795 | Great Britain | June 1, 1939 |